(12) United States Patent
Shin et al.

(10) Patent No.: US 10,698,396 B2
(45) Date of Patent: Jun. 30, 2020

(54) INFORMATION PROCESSING APPARATUS, INFORMATION PROCESSING METHOD, AND RECORDING MEDIUM

(71) Applicant: KABUSHIKI KAISHA TOSHIBA, Minato-ku (JP)

(72) Inventors: Hiromasa Shin, Yokohama (JP); Mitsuru Kakimoto, Kawasaki (JP); Yoshiaki Shiga, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 150 days.

(21) Appl. No.: 15/917,030

(22) Filed: Mar. 9, 2018

(65) Prior Publication Data
US 2019/0155267 A1 May 23, 2019

(30) Foreign Application Priority Data

Nov. 17, 2017 (JP) ................ 2017-221470

(51) Int. Cl.
*G06F 11/00* (2006.01)
*G05B 23/02* (2006.01)
(Continued)

(52) U.S. Cl.
CPC ..... *G05B 23/0221* (2013.01); *G05B 23/0283* (2013.01); *G06F 11/0721* (2013.01); *G06N 20/00* (2019.01)

(58) Field of Classification Search
CPC ...... G06F 11/07; G06F 11/00; G06F 11/0754; G06F 11/0757; G06F 11/076;
(Continued)

(56) References Cited

U.S. PATENT DOCUMENTS

| 9,702,928 B2 | 7/2017 | Holland et al. |
| 2002/0071367 A1* | 6/2002 | Brierley ............. G11B 20/1403 369/59.19 |

(Continued)

FOREIGN PATENT DOCUMENTS

| JP | 5617100 B2 | 11/2014 |
| JP | 2015-146568 | 8/2015 |
| JP | 2017-138660 | 8/2017 |

OTHER PUBLICATIONS

Nancy G. Leveson, "Safeware: System Safety and Computers", Addison-Wesley(Apr. 17, 1995, 5 pages.
(Continued)

*Primary Examiner* — Sarai E Butler
(74) *Attorney, Agent, or Firm* — Oblon, McClelland, Maier & Neustadt, L.L.P.

(57) ABSTRACT

An information processing apparatus has an input data acquisition unit that acquires a plurality of input data, a fault tolerance requirement acquisition unit that acquires a fault tolerance requirement for the plurality of input data, a training data definition unit that defines an output which satisfies the fault tolerance requirement, a fault pattern generation unit that generates a plurality of fault patterns which include at least one of the plurality of input data based on the plurality of input data and the fault tolerance requirement, a model update unit that updates the information processing model so as to tolerate a fault of the input data satisfying the fault tolerance requirement, and an execution control unit that applies the plurality of input data to the information processing model updated by the model update unit and executes the information processing model.

20 Claims, 6 Drawing Sheets

(51) Int. Cl.
*G06F 11/07* (2006.01)
*G06N 20/00* (2019.01)

(58) Field of Classification Search
CPC .... G06F 11/004; G06F 11/0751; G06F 11/30; G06F 2201/81
USPC ........................................................ 714/47.2
See application file for complete search history.

(56) References Cited

U.S. PATENT DOCUMENTS

| | | | | |
|---|---|---|---|---|
| 2006/0230306 | A1* | 10/2006 | Richards | G06F 11/076 714/6.32 |
| 2008/0320340 | A1* | 12/2008 | Weiberle | G06F 9/30181 714/48 |
| 2009/0063674 | A1* | 3/2009 | Brillhart | G01R 31/58 709/224 |
| 2009/0313195 | A1* | 12/2009 | McDaid | G06N 3/049 706/26 |
| 2010/0115335 | A1* | 5/2010 | Wylie | G06F 11/10 714/25 |
| 2012/0299864 | A1* | 11/2012 | Tong | G06F 1/1628 345/174 |
| 2014/0325277 | A1* | 10/2014 | Sonoda | G06F 11/263 714/27 |
| 2015/0254125 | A1* | 9/2015 | Kakui | G06F 11/0709 714/47.3 |
| 2015/0280968 | A1* | 10/2015 | Gates | G06F 11/0709 714/37 |
| 2015/0354176 | A1* | 12/2015 | Shatters | G01G 19/083 701/50 |
| 2016/0292028 | A1* | 10/2016 | Gamage | G06F 11/0772 |
| 2017/0193143 | A1* | 7/2017 | Saha | G06F 17/18 |

OTHER PUBLICATIONS https://en.wikipedia.org/wiki/Functional_safety, Mar. 2, 2018, 4 pages.
Trevor Hastie et al, "The Elements of Statistical Learning: Data Mining, Inference, and Prediction, Second Edition(Springer Series in Statistics)", Springer Mar. 2009, 764 pages.

* cited by examiner

| FAULT PATTERN | x1 | x2 | x3 | FORMULA OF FAULT PROBABILITY | FAULT PROBABILITY | |
|---|---|---|---|---|---|---|
| 0 | 0 | 0 | 0 | $(1-p1)*(1-p2)*(1-p3)$ | ≒ 1 | |
| 1 | 1 | 0 | 0 | $p1$ | 1/10 | ↑ FAULT PATTERN THAT NEEDS TO BE DEALT WITH |
| 2 | 0 | 1 | 0 | $p2$ | 1/10 | |
| 3 | 0 | 0 | 1 | $p3$ | 1/100 | |
| 4 | 1 | 1 | 0 | $p1*p2$ | 1/100 | |
| 5 | 0 | 1 | 1 | $p2*p3$ | 1/1000 | ↑ FAULT PATTERN THAT IS ALLOWED |
| 6 | 1 | 0 | 1 | $p1*p3$ | 1/1000 | |
| 7 | 1 | 1 | 1 | $p1*p2*p3$ | 1/10000 | |

※OCCURRENCE PROBABILITY IS 1 OR HIGHER (APPROXIMATELY 1) WHEN ADDED DUE TO OVERLAP

FIG.7

INFORMATION PROCESSING APPARATUS, INFORMATION PROCESSING METHOD, AND RECORDING MEDIUM

CROSS REFERENCE TO RELATED APPLICATIONS

This application is based upon and claims the benefit of priority from the prior Japanese Patent Application No. 2017-221470, filed on Nov. 17, 2017, the entire contents of which are incorporated herein by reference.

FIELD

Embodiments of the present invention relate to an information processing apparatus, an information processing method, and a recording medium.

BACKGROUND

In automatic driving vehicles and the like, various types of information processing are performed using a large number of sensor information, and it is possible to perform complicated and advanced information processing as the number of sensors increases, but a probability of a fault of a sensor also increases so that fault tolerance deteriorates.

There has been proposed a method for mitigating influence of a fault of a sensor and enhancing reliability of information processing with a hardware measure to multiplex sensors and suppress a fault probability and a software measure to add processing assuming the sensor fault.

When the above-described hardware measure is implemented, however, the hardware scale becomes large so that miniaturization is difficult and product cost also increases. In addition, a lot of time and development cost are required to implement the above-described software measure.

BRIEF DESCRIPTION OF THE DRAWINGS

FIG. 7 is a table illustrating an example of a fault pattern generated by a fault pattern generation unit.

DETAILED DESCRIPTION

According to one embodiment, an information processing apparatus has an input data acquisition unit that acquires a plurality of input data, a fault tolerance requirement acquisition unit that acquires a fault tolerance requirement for the plurality of input data, a training data definition unit that defines an output which satisfies the fault tolerance requirement when at least one input data among the plurality of input data is input to a predetermined information processing model, as training data, a fault pattern generation unit that generates a plurality of fault patterns which include at least one of the plurality of input data based on the plurality of input data and the fault tolerance requirement, a model update unit that updates the information processing model so as to tolerate a fault of the input data satisfying the fault tolerance requirement based on the plurality of fault patterns and the training data, and an execution control unit that applies the plurality of input data to the information processing model updated by the model update unit and executes the information processing model.

Hereinafter, embodiments will be described with reference to the drawings. In the present specification and accompanying drawings, the description and illustration are given by omitting, changing, or simplifying some components for ease of understanding and convenience in illustration, but technical contents at the extent with which similar functions can be expected are also interpreted as being included in the embodiments.

First Embodiment

Figure 1:
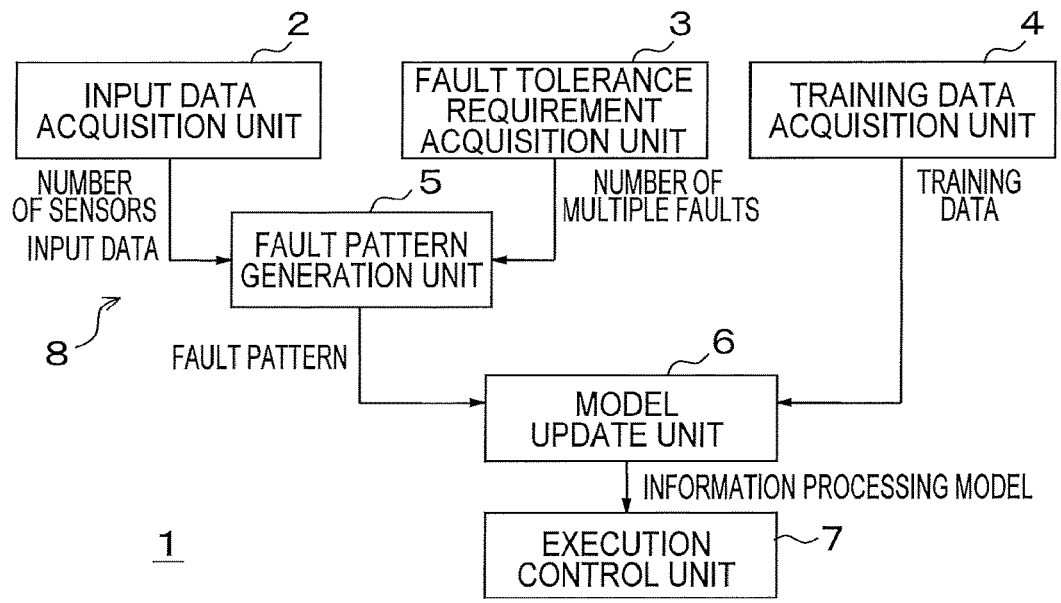
FIG. 1 is a block diagram illustrating a schematic configuration of an information processing apparatus according to a first embodiment.

FIG. 1 is a block diagram illustrating a schematic configuration of an information processing apparatus 1 according to a first embodiment. The information processing apparatus 1 of FIG. 1 includes an input data acquisition unit 2, a fault tolerance requirement acquisition unit 3, a training data definition unit 4, a fault pattern generation unit 5, a model update unit 6, and an execution control unit 7. In FIG. 1, the input data acquisition unit 2, the fault tolerance requirement acquisition unit 3, the training data definition unit 4, the fault pattern generation unit 5, and the model update unit 6 constitute an automatic design unit 8. That is, the information processing apparatus 1 in FIG. 1 roughly include the automatic design unit 8 and the execution control unit 7.

The information processing apparatus 1 in FIG. 1 can be configured using one or a plurality of hardware. Here, the hardware may be a semiconductor IC, or an electronic circuit in which a plurality of circuit elements are mounted on a circuit board. Alternatively, functions of the information processing apparatus 1 of FIG. 1 may be executed by a computer or a control circuit as software.

The input data acquisition unit 2 acquires a plurality of input data. In a more specific example, the input data acquisition unit 2 acquires a plurality of detection signals detected by each of a plurality of sensors as the plurality of input data. There is no limit on a type of the sensor. For example, when the information processing apparatus 1 of FIG. 1 performs information processing relating to a demand prediction for a certain target object or target service, some of the plurality of sensors may detect environmental information such as temperature and humidity. In addition, when the information processing apparatus 1 of FIG. 1 performs information processing for automatic driving, some of the plurality of sensors may be imaging sensors that capture the surroundings of a vehicle. Incidentally, the input data acquired by the input data acquisition unit 2 is not necessarily limited to the detection signal of the sensor. For example, the input data acquisition unit 2 may acquire output data of an external device other than the sensor as input data.

The fault tolerance requirement acquisition unit 3 acquires a fault tolerance requirement with respect to the plurality of input data acquired by the input data acquisition unit 2. In a more specific example, the fault tolerance requirement acquisition unit 3 acquires an upper limit value of the number of multiple faults indicating the number of faulty sensors among the plurality of sensors as the fault tolerance requirement. A case where the upper limit value of the number of multiple faults is one is referred to as a single fault, and a case where the upper limit value of the number of multiple faults is two is referred to as a double fault.

The training data definition unit 4 defines an output, which satisfies the fault tolerance requirement when at least one input data among the plurality of input data is input to a predetermined information processing model, as training data.

The fault pattern generation unit 5 generates a plurality of fault patterns each of which includes at least one of the plurality of input data based on the plurality of input data and the fault tolerance requirement. In a more specific example, the fault pattern generation unit 5 generates a fault pattern indicating a combination of detection signals of faulty sensors within a range of the number of faults equal to or less than the upper limit value of the number of multiple faults.

The model update unit 6 updates the information processing model so as to tolerate a fault of input data satisfying the fault tolerance requirement, based on the plurality of fault patterns and the training data.

Figure 2:
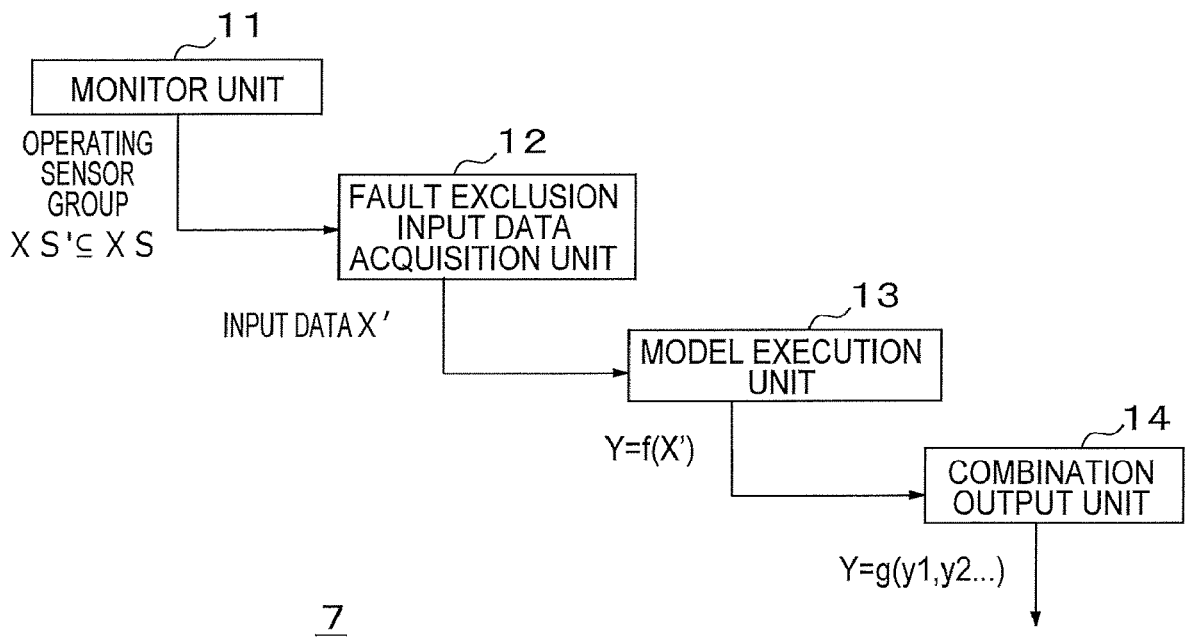
FIG. 2 is a block diagram illustrating an example of an internal configuration of an execution control unit.

The execution control unit 7 applies the plurality of input data to the information processing model updated by the model update unit 6 and executes the information processing model. FIG. 2 is a block diagram illustrating an example of an internal configuration of the execution control unit 7. The execution control unit 7 in FIG. 2 includes a monitor unit 11, a fault exclusion input data acquisition unit 12, a model execution unit 13, and a combination output unit 14.

The monitor unit 11 monitors whether at least one of the plurality of sensors are faulty. The fault exclusion input data acquisition unit 12 acquires a detection signal detected by a sensor other than the faulty sensor as input data. The model execution unit 13 uses the input data, acquired by the fault exclusion input data acquisition unit 12 for a plurality of information processing models updated by the model update unit 6, as an input to execute the information processing model. The combination output unit 14 combines output data obtained by executing the plurality of information processing models and outputs the combined output data.

Figure 3:
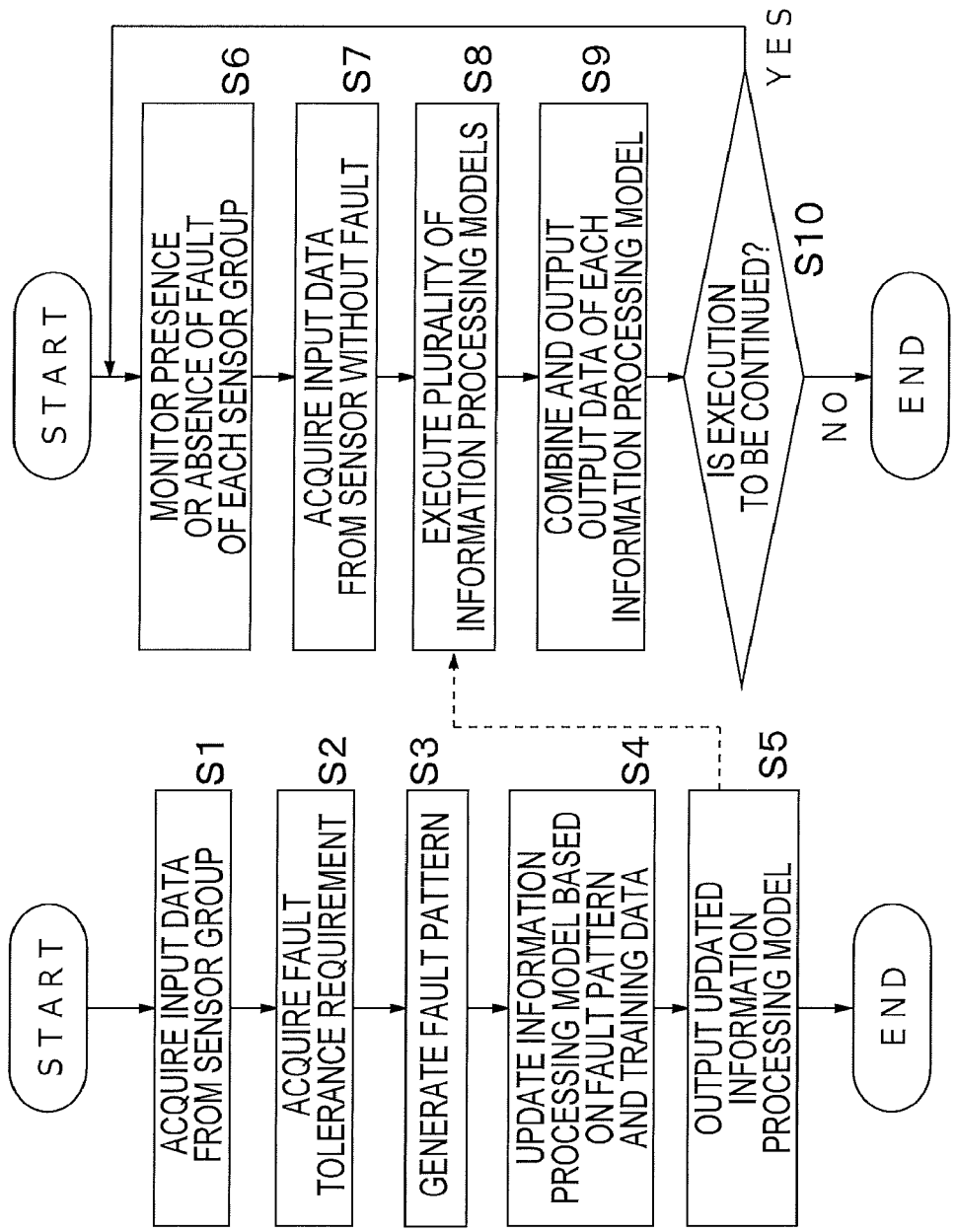
FIG. 3 is a flowchart illustrating an example of a processing procedure of the information processing apparatus of FIG. 1.

FIG. 3 is a flowchart illustrating an example of a processing procedure of the information processing apparatus 1 of FIG. 1. This flowchart illustrates an example in which the input data acquisition unit 2 acquires detection signals of a sensor group including the plurality of sensors. Steps S1 to S5 in FIG. 3 are processes of the automatic design unit 8, and Steps S6 to S10 are processes of the execution control unit 7.

First, the input data acquisition unit 2 acquires the detection signals from the plurality of sensors in the sensor group as the plurality of input data (Step S1). Next, the fault tolerance requirement acquisition unit 3 acquires a fault tolerance requirement K (Step S2). The fault tolerance requirement K may be input by an operator of the information processing apparatus 1 of FIG. 1 via a keyboard or the like, or may be selected by a mouse or the like from a selection screen prepared in advance. Alternatively, the fault tolerance requirement K may be read out from a storage device (not illustrated) that stores a value of the fault tolerance requirement K.

Next, the fault pattern generation unit 5 generates a plurality of fault patterns FS based on the plurality of input data and the fault tolerance requirement K (Step S3). Next, the model update unit 6 updates the plurality of information processing models corresponding to the plurality of fault patterns FS based on the plurality of fault patterns FS and the training data defined by the training data definition unit 4 (Step S4). Here, the plurality of information processing models are trained (updated) using the training data so as to obtain an appropriate information processing result even when some sensors are faulty and effective input data is not input.

When the update of the plurality of information processing models is completed, the plurality of updated information processing models are output (Step S5).

When the process of Step S5 is ended, the process proceeds to the processing of the execution control unit 7. Incidentally, the processing of the automatic design unit 8 of Steps S1 to S5 may be continuously performed while the processing of the execution control unit 7 is being performed. The monitor unit 11 inside the execution control unit 7 monitors whether each sensor belonging to the sensor group is faulty (Step S6). The monitoring of the sensor group may be performed continuously or intermittently. The fault exclusion input data acquisition unit 12 acquires the detection signal of the sensor other than the faulty sensor as input data (Step S7).

The information processing execution unit inputs the input data acquired in Step S7 to the plurality of information processing models output in Step S5 and executes the respective information processing models (Step S8). Subsequently, the combination output unit 14 combines and outputs the output data of the respective information processing models (Step S9). Next, whether to continue the execution of information processing is determined (Step S10). The processing returns to Step S6 in the case of continuing the execution, and the processing is ended in the case of stopping the execution. Next, a processing operation of the model update unit 6 will be described in detail. It is assumed that the whole set of input data used in machine learning is XS. The following Formula (1) represents an information processing model M1 using information sources (explanatory variables) x1 and x2, such as sensors, as input data. Hereinafter, the information processing model may be also simply referred to as a model.

$$M1 = \{x1, x2\} \subseteq XS \tag{1}$$

In addition, when it is assumed that a model set including all models to be updated by the model update unit 6 is MS, the input data XS is expressed by the following Formula (2), an information processing model Mi is expressed by Formula (3), the model set MS is expressed by Formula (4).

$$XS := \{x_1, x_2, \ldots, x_n\} \tag{2}$$

$$M_j := \{x_{i_1}, x_{i_2}, \ldots, x_{i_{n(j)}}\} \subseteq XS \tag{3}$$

$$MS = \{M_1, M_2, \ldots, M_m\} \tag{4}$$

The model set MS and a function F representing a fault of the information processing model Mi are expressed by the following Formulas (5) and (6), respectively.

$$F(MS) = F(M_1)F(M_2) \ldots F(M_m) \tag{5}$$

$$F(M_j) = x_{i_1} + x_{i_2} + \ldots + x_{i_{n(j)}} \tag{6}$$

It is possible to analyze when the model set MS is faulty by examining each term at the time of converting a logical expression F(MS), which is a function representing a fault, into a disjunctive normal form DNF. For example, when the model set MS={M1, M2} has two models M1={x1, x2} and M2={x1, x3}, the fault pattern FS has four patterns (x1, x1x2, x1x3, and x2x3). Both the models M1 and M2 contain terms of primary explanatory variables, and thus, are vulnerable to the single fault.

Thus, a fault probability Y of the model set MS is expressed by the following Formula (7).

$$Y=F(MS)=(x_1+x_2)(x_1+x_3)=x_1+x_1x_2+x_1x_3+x_2x_3 \quad (7)$$

An updating procedure of the model set MS performed by the model update unit 6 is not limited to one procedure. Hereinafter, a sequential extension method and an operation example thereof will be described as the updating procedure.

Figure 4:
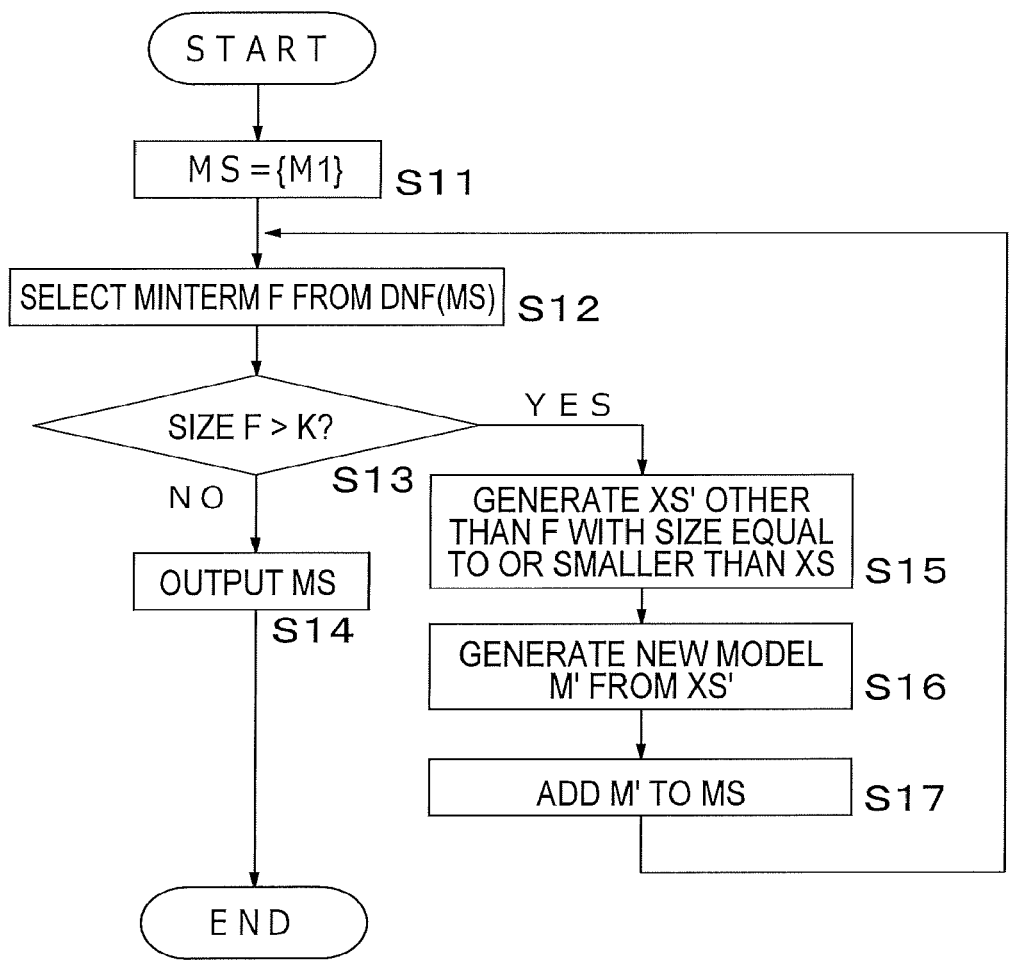
FIG. 4 is a flowchart illustrating a processing procedure of a sequential extension method of a model set.

FIG. 4 is a flowchart illustrating a processing procedure of the sequential extension method of the model set MS. First, the model set MS is initialized to an initial model M1 (Step S11). That is, MS={M1} is set. Here, a required fault tolerance level K is input to generate the initial model M1 that satisfies the fault tolerance level K.

Next, a minterm F is selected from a fault pattern DNF (MS) of the model set MS (Step S12). Whether a size of the minterm F is larger than the fault tolerance requirement K is determined (Step S13). If |F|>K, the model set MS is output (Step S14) and the processing in FIG. 4 is ended. Here, XS represents the set of explanatory variables.

If |F|≤K, a set XS' of explanatory variables other than the minterm F with a smaller size than XS is generated (Step S15). At this time, it is unnecessary to use all the variables of the set XS', and a model M' obtained by narrowing down the variables by applying a predetermined variable selection algorithm may be set as a new model. Next, a new model M' is generated from the generated set XS' (Step S16). Next, the generated new model M' is added to the model set MS, and the processing returns to Step S12.

In the sequential extension method of the model set MS, the model set is extended from the initial model as a starting point until meeting a designated multiple fault level. A process in which a calculation processing amount is increased in an exponential order in the processing procedure of FIG. 4 is the process of calculating the disjunctive normal form DNF(MS) indicating the fault pattern FS from the model set MS. The purpose of calculation of DNF(MS) is to investigate tolerance to a multiple fault of at most K or less. This purpose is achieved by calculating whether the model set MS becomes a true value when subsets having a size of K or less are enumerated from the explanatory variable set XS and true values are assigned to variables of the respective subsets. If a variable size N is O(10) and the fault tolerance level K is about 1 to 3, the purpose is sufficiently achieved with simple numerical calculation.

Figure 5:
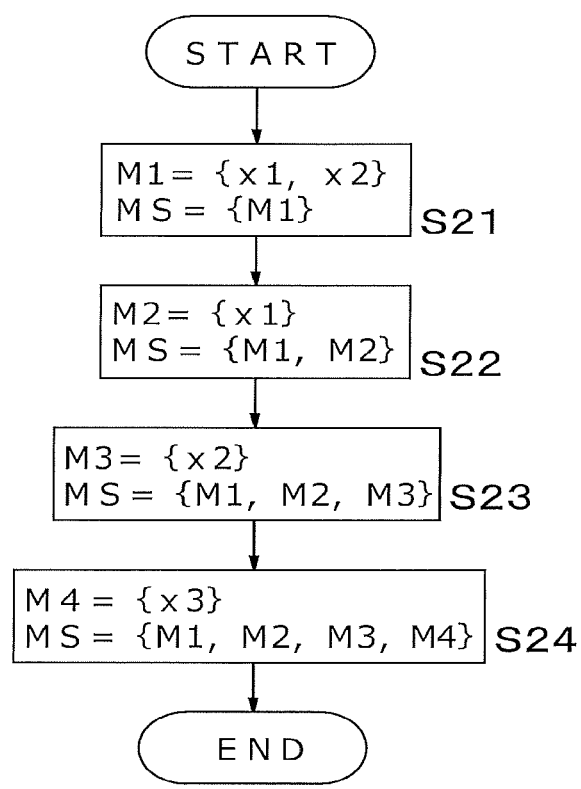
FIG. 5 is a flowchart illustrating an operation example of the sequential extension method of the model set.

FIG. 5 is a flowchart illustrating an operation example of the sequential extension method of the model set MS. This flowchart illustrates an example of handling a small-scale fault pattern FS in order to describe a processing procedure of a patch extension method in an easy-to-understand manner. In this example, the explanatory variable set XS has three variables {x1, x2, x3}, and the fault tolerance number K is 2. In addition, a priority of each explanatory variable in the set XS is set such that x1>x2>x3, and an explanatory variable with a higher priority is selected at the time of selecting an explanatory variable.

First, an initial model M1={x1, x2} is obtained, and the model set MS={M1} is obtained (Step S21). At this time, DNF(MS)=x1x2, which is vulnerable to a single fault indicating a fault of either x1 or x2. Thus, for example, in order to take a countermeasure for x2's fault, a model M2={x1} in which the input variable XS' to the model is restricted such that XS'=XS−{x2}={x1, x3} is generated, thereby extending the model set such that MS={M1, M2} (Step S22).

At this time, since DNF(MS)=x1+x1x2, it is necessary to take a countermeasure for x1's fault, and a model M3={x2} is generated similarly to in Step S22 to extend the model set such that MS={M1, M2, M3} (Step S23).

Next, a model M4={x3} is generated to keep extending the model set MS, and eventually, a model set MS={M1, M2, M3, M4}={{x1, x2}, {x1}, {x2}, {x3}}, constituted by the four models that can tolerate a double fault, is generated (Step S24).

In this manner, the model is updated so as to satisfy the fault tolerance requirement assuming the fault of the input data such as the sensor detection signal, the input data is applied to the updated model, and the model is executed to perform the desired information processing in the first embodiment. Thus, it is possible to perform various types of information processing stably and accurately even when, for example, some of the sensors are faulty and some pieces of the input data are not correctly input.

In particular, the fault pattern FS is generated within the range of the number of faults equal to or less than the upper limit value of the number of multiple faults, and the model is updated so as to perform the highly reliable information processing using the input data that is not included in the fault pattern FS in the first embodiment. Thus, it is possible to perform the highly reliable information processing even when there are some pieces of faulty input data by executing the updated model.

Second Embodiment

Figure 6:
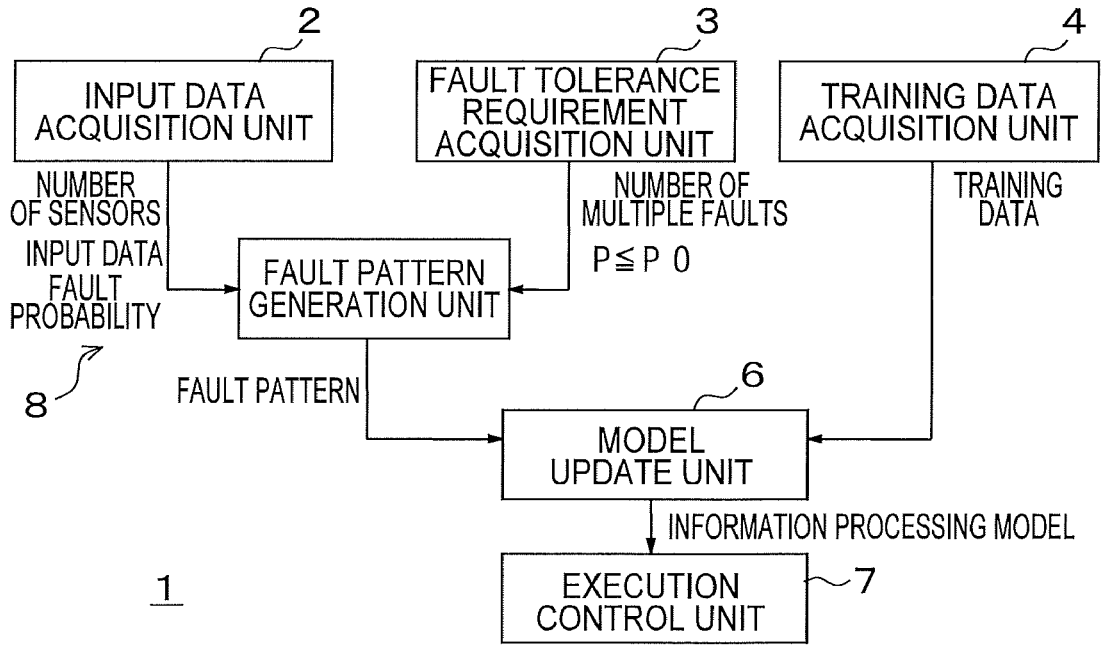
FIG. 6 is a block diagram illustrating a schematic configuration of an information processing apparatus according to a second embodiment.

In a second embodiment, a model is updated by setting an upper limit for the fault probability. FIG. 6 is a block diagram illustrating a schematic configuration of an information processing apparatus 1 according to the second embodiment. The information processing apparatus 1 of FIG. 6 includes an input data acquisition unit 2, a fault tolerance requirement acquisition unit 3, a training data definition unit 4, a fault pattern generation unit 5, a model update unit 6, and an execution control unit 7 similarly to that of FIG. 1, but is different from that of FIG. 1 in terms of content of input data acquired by the input data acquisition unit 2, content of a fault requirement acquired by the fault tolerance requirement acquisition unit 3, and processing content of the fault pattern generation unit 5.

The input data acquired by the input data acquisition unit 2 includes a fault probability PS of each input data in addition to the input data acquired by the input data acquisition unit 2 of FIG. 1. For example, when detection signals from three sensors are input as input data, the input data acquisition unit 2 acquires not only input data XS={x1, x2, x3} corresponding to these detection signals from the three sensors but also the fault probability PS={p1, p2, p3} of each sensor.

The fault pattern generation unit 5 generates a fault pattern FS that needs to be dealt with so as to make a fault probability P of a model set equal to or lower than a predetermined value P0.

FIG. 7 is a table illustrating an example of the fault pattern FS generated by the fault pattern generation unit 5. FIG. 7 illustrates an example in which the input data XS={x1, x2, x3} constituted by the detection signals of the three sensors and the fault probability PS={p1, p2, p3} of each sensor are input. In FIG. 7, it is assumed that a fault of each sensor occurs independently, and the fault probability P of the entire information processing apparatus 1 is set such that P≤P0=1/500 or lower.

In FIG. 7, a probability of no fault is (1−p1)*(1−p2)*(1−p3). A probability of a single fault is p1=1/10, p2=1/10, and p3=1/100. A probability of a double fault is p1*p2=1/100, p2*p3=1/1000, and p3*p1=1/1000.

A probability of a triple fault is p1*p2*p3=1/10000.

It is assumed that P≤P0=1/500 or lower is required as the fault probability P of the entire information processing apparatus 1. Since a probability that the fault patterns FS overlap each other is low, a rough estimation is performed with simple addition by arranging the fault patterns FS in descending order of a fault occurrence probability. An allowable fault pattern FS is set to fault patterns 5 to 7 in FIG. 7 having the occurrence probability of 1/500 or lower in ascending order of the occurrence probability. A fault pattern FS that needs to be dealt with is fault patterns 0 to 4 other than the allowable patterns, that is, FS={{x1}, {x2}, {x3}, {x1, x2}}. The model update unit 6 generates a model using a variable set X'=X−f excluding each fault f∈FS as an input.

Figure 8:
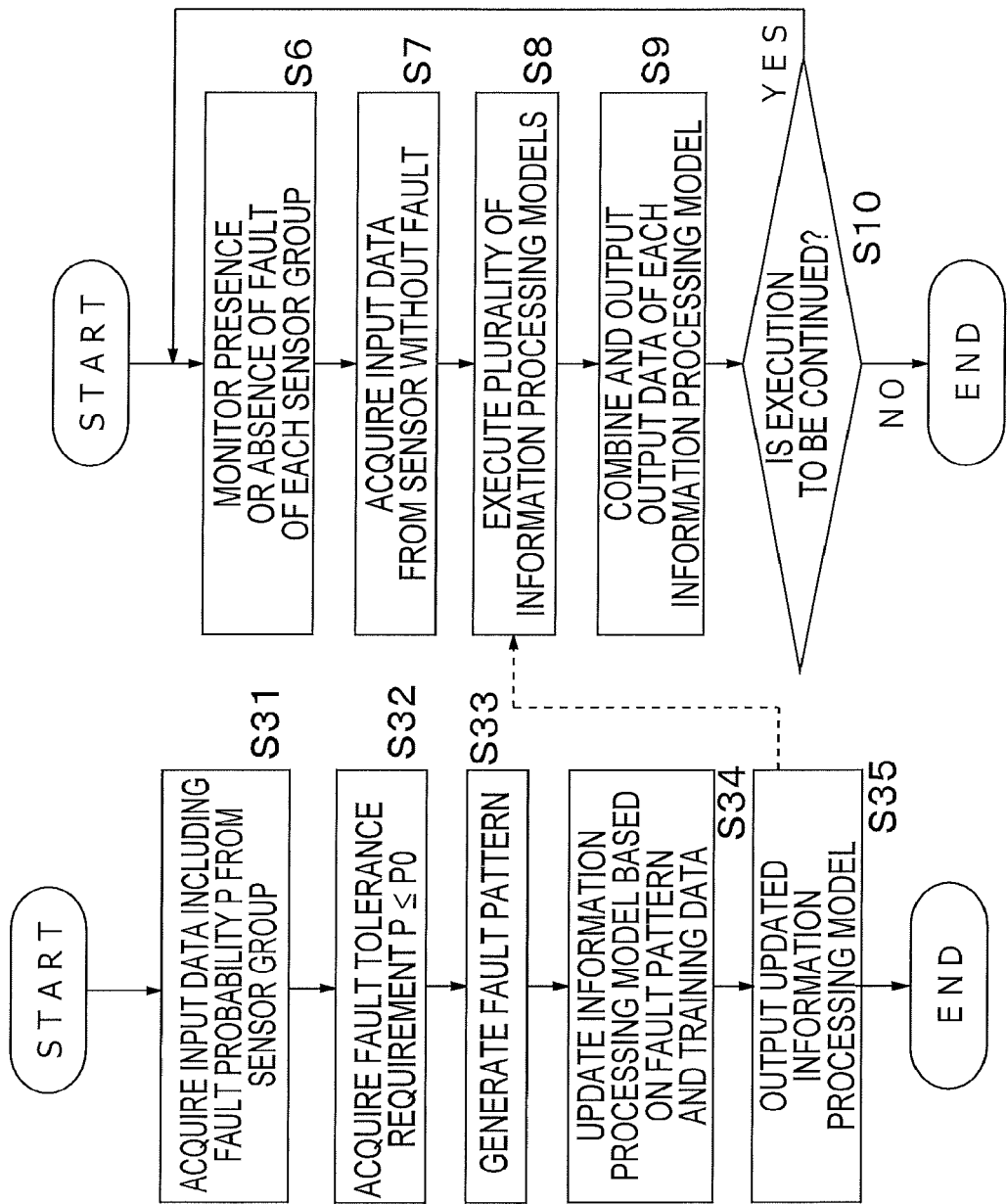
FIG. 8 is a flowchart illustrating an example of a processing procedure of the information processing apparatus of FIG. 6.

FIG. 8 is a flowchart illustrating an example of a processing procedure of the information processing apparatus 1 of FIG. 6. First, the input data acquisition unit 2 acquires detection signals from a plurality of sensors in a sensor group and a fault probability of each sensor as input data (Step S31). Next, the fault tolerance requirement acquisition unit 3 acquires an allowable upper limit value P0 of the fault probability as the fault tolerance requirement (Step S32). Next, the fault pattern generation unit 5 generates the fault pattern FS based on the upper limit value P0 of the fault probability (Step S33). Next, the model update unit 6 updates a plurality of information processing models corresponding to a plurality of fault patterns FS based on the plurality of fault patterns FS and training data defined by the training data definition unit 4 (Step S34). When the update of the plurality of information processing models is completed, the plurality of updated information processing models are output (Step S35). The processing of the execution control unit 7 performed after the process of Step S35 is the same as that of FIG. 3.

Next, a processing operation of the information processing apparatus 1 according to the second embodiment will be described in more detail. When fault probabilities of a plurality of input data are greatly different from each other, there is a case where it is difficult to secure a necessary reliability only by designating a level of a multiple fault as in the first embodiment. For example, when each fault probability of an explanatory variable x1 and an explanatory variable x2 is 1/10 and a fault probability of an explanatory variable x3 is 1/1000, the fault probability of the explanatory variable x3 is lower than a probability that the explanatory variables x1 and x2 simultaneously become faulty. In such a case, it is difficult to say that a measure against a double fault is sufficient. It is necessary to determine a model set MS such that the fault probability of the information processing apparatus 1 does not exceed the upper limit value upon giving the upper limit value of the fault probability as the fault tolerance requirement.

When the model set MS includes a plurality of models, the overall fault probability decreases if each model independently becomes faulty. In general, there is a case where the respective models are not independent and the plurality of models use the same explanatory variable as input data, which causes a common cause fault CCF. When considering the fault probability of the information processing apparatus 1, it is necessary to consider such CCF.

A probability variable Xi is 1 when input data xi is faulty, and is 0 when the input data xi is normal. Since the probability variable X takes the value of 0 or 1, even a power of the value does not change from the value. That is, an algebraic simplification rule X*X=X can be applied as the probability variable X.

A fault probability p is expressed by the following Formula (8).

$$p=E[Xi]=(1-pi)\times 0+pi\times 1=pi \qquad (8)$$

Regarding the calculation of the probability variable, a logical product AND is expressed by the following Formula (9), and a logical sum OR is expressed by the following Formula (10).

$$\mathrm{AND}(x1,x2)=1-(1-x1)*(1-x2) \qquad (9)$$

$$\mathrm{OR}(x1,x2)=x1*x2 \qquad (10)$$

A probability variable Y representing a fault of the entire information processing apparatus 1 including a model set MS={M1, M2} constituted by models M1(x1, x2) and M2(x1, x2) is expressed by the following Formula (11).

$$Y=\mathrm{AND}(\mathrm{OR}(x1,x2),\mathrm{OR}(x1,x3))=(x1+x2-x1*x2)*(x1+x3-x1*x3)=x1+x1*x3+x2*x3-x1*x2 \qquad (11)$$

Thus, a fault probability E[Y] of the entire information processing apparatus 1 is expressed by the following Formula (12).

$$E[Y]=p1+p1*p3+p2*p3-p1*p2 \qquad (12)$$

In the present embodiment, the model is updated so as to perform information processing using input data that is not included in each fault pattern FS such that the fault probability of the entire information processing apparatus does not exceed the upper limit value. By taking the fault probability into consideration, it is possible to improve the reliability of the information processing model even when the fault probability greatly differs depending on the fault pattern.

In this manner, the upper limit value of the fault probability is set as the fault tolerance requirement and the information processing model is updated so as not to reach the upper limit value of the fault probability in the second embodiment. Thus, it is possible to determine a highly reliable model and to improve the reliability of the information processing even when some pieces of the input data are faulty.

Third Embodiment

The information processing apparatus 1 according to the first and second embodiments can be applied to a demand prediction of various target objects or target service. There is no limit on specific content of the target object or target service, but the information processing apparatus 1 can be applied, for example, to a prediction of a demand for power, a prediction of sales of a product being sold at a store, or the like.

For example, there are a learning phase and a prediction phase in information processing using machine learning to predict the power demand. A fault of a sensor used to predict the power demand may occur in both the learning and prediction phases. In the learning phase, a fault is caused as a detection signal of a certain sensor referred to by a certain prediction model at the time of learning is unusable. In the next prediction phase, a fault is caused as a detection signal of a certain sensor referred to by a certain prediction model is unusable.

Eventually, outputs of prediction models without faults are collected to take a weighted average thereof, and the average is taken as a prediction value of the information processing apparatus 1.

Incidentally, a fault relating to a machine learning function may occur in either the learning phase or the prediction phase. Considering a realistic situation, a factor of the fault is not limited to an information source such as a sensor, but is often a combination of the information source and the prediction model. For example, it is assumed that a periodic re-learning function is incorporated in the case of the demand prediction in order to maintain prediction accuracy over a long term. When diversity of data to be used for re-learning is insufficient, for example, when explanatory variables of a multiple regression model strongly correlate, the learning sometimes ends abnormally. In addition, even if data to be used for a prediction has been prepared, the prediction sometimes ends abnormally when the data greatly exceeds a data range at the time of learning, such as when the data deviates from the data range at the time of learning by regression using a smoothing spline as in a generalized additive model. In this manner, the factor of the fault of the machine learning is derived from compatibility between use data and a learning model in many cases.

A prediction model is combined by blending outputs of normal prediction models that have not been faulty so as to emphasize a result with a small error upon referring to a score value of a prediction error.

In this manner, it is possible to deal with the fault of the information source such as the sensor that may occur in the learning phase or the prediction phase by combining the plurality of prediction models. A set of the prediction models is characterized by enumerating a set of the information sources referred to by the prediction models.

At least a part of the information processing apparatus 1 described in the above embodiments may be configured by hardware or software. When configured by the software, a program to implement at least some functions of the information processing apparatus 1 may be stored in a storage medium, such as a flexible disk and a CD-ROM, and then may be read and executed by a computer. The recording medium is not limited to a detachable storage medium, such as a magnetic disk and an optical disc, and may be a fixed recording medium, such as a hard disk and a memory.

In addition, the program to implement at least some functions of the information processing apparatus 1 may be distributed through a communication line (including radio communication) such as the Internet. Further, the program that has been encrypted, modulated, or compressed, may be distributed through a wired line or a wireless line, such as the Internet, or may be stored in a recording medium and then may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processing apparatus comprising:
    an input data acquisition unit that acquires a plurality of input data;
    a fault tolerance requirement acquisition unit that acquires a fault tolerance requirement for the plurality of input data;
    a data selection unit that selects an output data which satisfies a fault tolerance requirement when at least one input data among the plurality of input data is input to a predetermined information processing model, as training data;
    a fault pattern generation unit that generates a plurality of fault patterns which include at least one of the plurality of input data based on the plurality of input data and the fault tolerance requirement;
    a model update unit that updates an information processing model so as to tolerate a fault of the input data satisfying the fault tolerance requirement based on the plurality of fault patterns and the training data; and
    an execution control unit that applies the plurality of input data to the information processing model updated by the model update unit and executes an information processing by using the information processing model.

2. The information processing apparatus according to claim 1, wherein
    the input data acquisition unit acquires a plurality of detection signals detected by a plurality of sensors as the plurality of input data,
    the fault tolerance requirement acquisition unit acquires an upper limit value of a number of multiple faults which indicates a number of faulty sensors among the plurality of sensors, as the fault tolerance requirement,
    the fault pattern generation unit generates the fault patterns indicating a combination of detection signals of the faulty sensors within a range of a number of faults equal to or less than the upper limit value of a number of the multiple faults, and
    the model update unit updates the information processing model so as to perform information processing that satisfies the fault tolerance requirement by using input data which is not included in the fault patterns.

3. The information processing apparatus according to claim 2, wherein
    the fault pattern generation unit generates the plurality of fault patterns by searching combinations of the plurality of input data in descending order of a number of the combinations within the range of the number of faults equal to or less than the upper limit value of the number of the multiple faults.

4. The information processing apparatus according to claim 2, wherein
    the fault pattern generation unit generates a fault pattern corresponding to a new information processing model, which uses a detection signal of a sensor other than the faulty sensor as an input signal within the range of the number of faults equal to or less than the upper limit value of the number of the multiple faults.

5. The information processing apparatus according to claim 2, wherein
    the model update unit updates a plurality of information processing models corresponding to the plurality of fault patterns, and
    the execution control unit comprises:
    a monitoring unit that monitors whether at least one of the plurality of sensors is faulty;
    a fault exclusion input data acquisition unit that acquires a detection signal detected by a sensor other than a faulty sensor as input data; and
    a combination output unit that combines output data obtained by executing the plurality of information processing models using the input data acquired by the fault exclusion input data acquisition unit and outputs the combined output data.

6. The information processing apparatus according to claim 1, wherein
the input data acquisition unit acquires a plurality of detection signals detected by a plurality of sensors as the plurality of input data,
the fault tolerance requirement acquisition unit acquires a fault probability of an arbitrary combination of the plurality of sensors as the fault tolerance requirement, and
the fault pattern generation unit generates the plurality of fault patterns with the fault probability equal to or lower than a predetermined upper limit value.

7. The information processing apparatus according to claim 2, wherein
the plurality of sensors output the plurality of detection signals relating to a demand prediction of a predetermined target object or target service.

8. An information processing method comprising:
acquiring a plurality of input data;
acquiring a fault tolerance requirement for the plurality of input data;
selecting an output data which satisfies the fault tolerance requirement when at least one input data among the plurality of input data is input to a predetermined information processing model, as training data;
generating a plurality of fault patterns which include at least one of the plurality of input data based on the plurality of input data and the fault tolerance requirement;
updating an information processing model so as to tolerate a fault of the input data satisfying the fault tolerance requirement based on the plurality of fault patterns and the training data; and
applying the plurality of input data to the information processing model updated by the updating and executing an information processing by using the information processing model.

9. The information processing method according to claim 8, wherein
the acquiring the input data acquires a plurality of detection signals detected by a plurality of sensors as the plurality of input data,
the acquiring the fault tolerance requirement acquires an upper limit value of a number of multiple faults which indicates a number of faulty sensors among the plurality of sensors, as the fault tolerance requirement,
the generating the plurality of fault patterns generates the fault patterns indicating a combination of detection signals of the faulty sensors within a range of a number of faults equal to or less than the upper limit value of a number of the multiple faults, and
the updating the information updates the information processing model so as to perform information processing that satisfies the fault tolerance requirement by using input data which is not included in the fault patterns.

10. The information processing method according to claim 9, wherein
the generating the plurality of fault patterns generates the plurality of fault patterns by searching combinations of the plurality of input data in descending order of a number of the combinations within the range of the number of faults equal to or less than the upper limit value of the number of the multiple faults.

11. The information processing method according to claim 9, wherein
the generating the plurality of fault patterns generates a fault pattern corresponding to a new information processing model, which uses a detection signal of a sensor other than the faulty sensor as an input signal within the range of the number of faults equal to or less than the upper limit value of the number of the multiple faults.

12. The information processing method according to claim 9, wherein
the updating the information processing model updates a plurality of information processing models corresponding to the plurality of fault patterns, and
the executing the information processing model comprises:
monitoring whether at least one of the plurality of sensors is faulty;
acquiring a detection signal detected by a sensor other than a faulty sensor as input data; and
combining output data obtained by executing the plurality of information processing models using the input data acquired by the fault exclusion input data acquisition unit and outputs the combined output data.

13. The information processing method according to claim 8, wherein
the acquiring the plurality of input data acquires a plurality of detection signals detected by a plurality of sensors as the plurality of input data,
the acquiring the fault tolerance requirement acquires a fault probability of an arbitrary combination of the plurality of sensors as the fault tolerance requirement, and
the generating the plurality of fault patterns generates the plurality of fault patterns with the fault probability equal to or lower than a predetermined upper limit value.

14. The information processing method according to claim 9, wherein
the plurality of sensors output the plurality of detection signals relating to a demand prediction of a predetermined target object or target service.

15. A non-transitory computer readable recording medium that stores a program, the program that causes a computer to execute:
acquiring a plurality of input data;
acquiring a fault tolerance requirement for the plurality of input data;
selecting an output data which satisfies the fault tolerance requirement when at least one input data among the plurality of input data is input to a predetermined information processing model, as training data;
generating a plurality of fault patterns which include at least one of the plurality of input data based on the plurality of input data and the fault tolerance requirement;
updating an information processing model so as to tolerate a fault of the input data satisfying the fault tolerance requirement based on the plurality of fault patterns and the training data; and
applying the plurality of input data to the information processing model updated by the updating and executing an information processing by using the information processing model.

16. The recording medium according to claim 15, wherein
the acquiring the input data acquires a plurality of detection signals detected by a plurality of sensors as the plurality of input data, the acquiring the fault tolerance requirement acquires an upper limit value of a number of multiple faults which indicates a number of faulty sensors among the plurality of sensors, as the fault tolerance requirement, the generating the plurality of fault patterns generates the fault patterns indicating a combination of detection signals of the faulty sensors within a range of a number of faults equal to or less than the upper limit value of a number of the multiple faults, and the updating the information updates the information processing model so as to perform information processing that satisfies the fault tolerance requirement by using input data which is not included in the fault patterns.

17. The recording medium according to claim 16, wherein the generating the plurality of fault patterns generates the plurality of fault patterns by searching combinations of the plurality of input data in descending order of a number of the combinations within the range of the number of faults equal to or less than the upper limit value of the number of the multiple faults.

18. The recording medium according to claim 16, wherein the generating the plurality of fault patterns generates a fault pattern corresponding to a new information processing model, which uses a detection signal of a sensor other than the faulty sensor as an input signal within the range of the number of faults equal to or less than the upper limit value of the number of the multiple faults.

19. The recording medium according to claim 16, wherein the updating the information processing model updates a plurality of the information processing models corresponding to the plurality of fault patterns, and the executing the information processing model comprises:

monitoring whether at least one of the plurality of sensors is faulty;

acquiring a detection signal detected by a sensor other than a faulty sensor as input data; and combining output data obtained by executing the plurality of information processing models using the input data acquired by the fault exclusion input data acquisition unit and outputs the combined output data.

20. The recording medium according to claim 15, wherein the acquiring the plurality of input data acquires a plurality of detection signals detected by a plurality of sensors as the plurality of input data, the acquiring the fault tolerance requirement acquires a fault probability of an arbitrary combination of the plurality of sensors as the fault tolerance requirement, and the generating the plurality of fault patterns generates the plurality of fault patterns with the fault probability equal to or lower than a predetermined upper limit value.

* * * * *